Dec. 14, 1937.  W. NOBLE  2,101,869
VIBRATION REDUCING MEANS
Filed Nov. 27, 1934  2 Sheets—Sheet 1
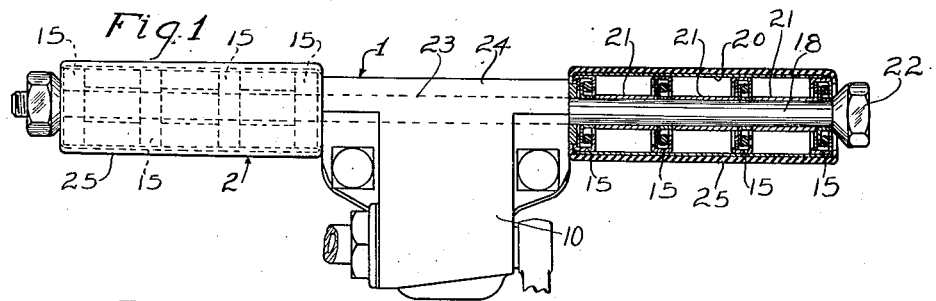
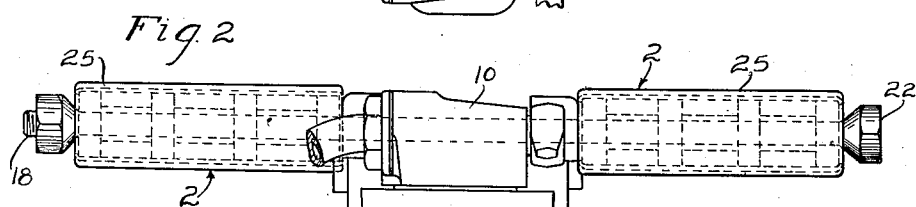
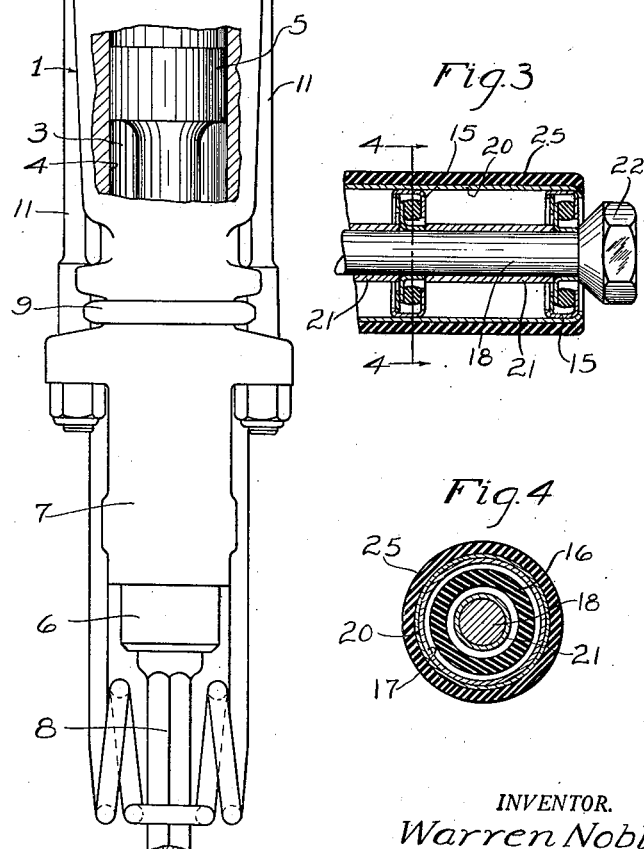
INVENTOR.
Warren Noble
BY
ATTORNEY Dec. 14, 1937.  W. NOBLE  2,101,869
VIBRATION REDUCING MEANS
Filed Nov. 27, 1934  2 Sheets-Sheet 2
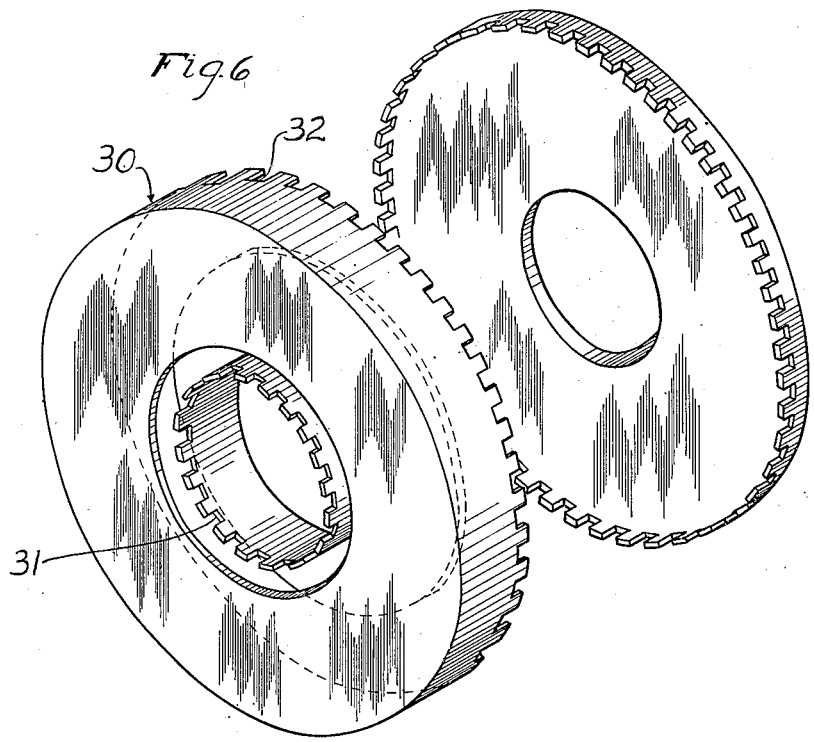
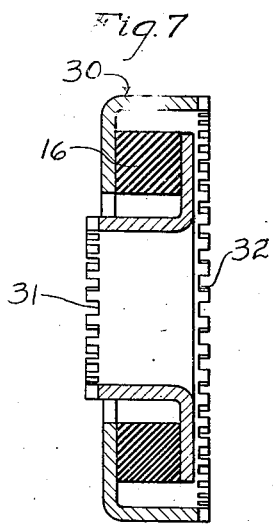
INVENTOR.
Warren Noble
BY
ATTORNEY.

Patented Dec. 14, 1937

2,101,869

UNITED STATES PATENT OFFICE 2,101,869

VIBRATION REDUCING MEANS

Warren Noble, Michigan City, Ind., assignor to Sullivan Machinery Company, a corporation of Massachusetts Application November 27, 1934, Serial No. 755,011

14 Claims. (Cl. 121—36)

This invention relates to vibration reducing means, and more particularly to a method of and means for interconnecting parts subject to vibration in order to modify the transmitted effect.

An object of this invention is to provide an improved vibration reducing means. Another object is to provide an improved vibration reducing means having associated therewith improved damping means for modifying the action thereof. A further object is to provide an improved vibration reducing and damping unit adapted to precision manufacture, for interchangeability, which may be employed in single or multiple, and which provides certain additional useful functions beyond its vibration quenching property. A still further object is to provide an improved vibration reducing unit having associated therewith improved damping means in the form of a frictional damping element for modifying movement between parts of the unit. Still another object is to provide an improved vibration reducing unit in the form of a rubber annulus in shear bonded to inner and outer, concentric annuli and having arranged in frictional contact with the annuli thereof a damping plate for modifying the action of the rubber annulus. A further object is to provide an improved vibration reducing unit of the above character which may be used in single or multiple in accordance with the intensity of the vibrative effect to be modified. These and other objects and advantages of the invention will, however, hereinafter more fully appear in the course of the following description, and as more particularly pointed out in the appended claims.

In the accompanying drawings there are shown for purposes of illustration two forms which the invention may assume in practice.

In these drawings,—

Fig. 1 is an end view of a hammer rock drill to which one illustrative form of the improved vibration reducing means is applied, a portion of the latter being shown in horizontal section to illustrate structural details.

Fig. 2 is a side elevational view of a rock drill with which the improved vibration reducing means is associated.

Fig. 3 is an enlarged detail sectional view of a portion of the improved vibration reducing means.

Fig. 4 is a cross sectional view taken on line 4—4 of Fig. 3.

Fig. 5 is an enlarged axial sectional view of one of the improved vibration reducing and damping units.

Fig. 6 is a perspective view showing a modified form of construction.

Fig. 7 is an axial sectional view of the vibration reducing unit shown in Fig. 6.

In this illustrative construction the improved vibration reducing means is shown applied to a hammer rock drill of the hand held type and arranged between the grasping portions of the drill supporting handle and the drill hammer motor whereby the vibration effect of the hammer motor transmitted to the handle grasping portions is substantially reduced. It will be evident, however, that the vibration reducing means may have general application and may be employed to reduce vibration between parts of machines of various character. The rock drill disclosed herein generally comprises a hammer motor I and a supporting handle structure 2. The hammer motor herein comprises a cylinder 3 having a bore 4 containing a reciprocatory hammer piston 5. Mounted in a chuck 6 carried within a front chuck housing 7 is a drill steel 8 having its shank arranged in position to receive the impact blows of the hammer piston 5. The motor cylinder has a front head 9 interposed between the cylinder and chuck housing and a rear head 10, and these heads and the chuck housing are maintained in assembled relation with respect to the cylinder by means of usual side bolts 11, 11. As the design of the particular rock drill shown is well known, further description thereof is herein considered unnecessary, since it does not enter into the invention other than its particular cooperation with the supporting handle structure.

The vibration reducing and damping means consists herein of a plurality of units, each generally designated 15 and embodying a rubber ring or annulus 16 bonded, as by vulcanizing, to inner and outer concentric annuli. An analogy may well be found in the annular ball bearing except that in place of providing a rotative function, the unit under consideration offers a vibration quenching capability between concentrically arranged elements. The outer annulus 17 is in the form of a cup pierced in its bottom with a hole larger than the supporting bolt 18 of the handle structure, and 19 is a thimble fitting the bolt 18 and as much smaller than the internal diameter of the cup 17 as to its flange diameter as the hole in the center of the cup is larger than the shank of the flange. Between the inwardly extending flange of the cup 17 and the outwardly extending flange of the thimble 19 is bonded, as by vulcanizing, a ring of rubber or of material of similar composition and having similar characteristics. The thimble is thus supported concentrically within the cup by means of the rubber ring, and displacement of the thimble can, of course, take place radially to the extent of freedom permitted by the differences in the mechanical dimensions as well as in other directions.

In the case of the drill handle structure shown, each grasping portion has four such units supported inside a tube 20, spaced by means of sleeves 21, 21 surrounding the bolt 18 and interposed between the units, and these spacer sleeves permit the complete assembly to be bound endwise by a nut 22 threaded on the end of the bolt 18. In this particular instance, the bolt 18 is mounted in a transverse bore 23 formed in a lateral boss 24 integral with the back motor head 10, and the vibration reducing units are bound endwise by tightening of the nut 22 between the adjacent face of the boss and the nut. Surrounding the metal sleeve 20 is the grasping portion 25 of the handle grip, herein in the form of a rubber sleeve tightly embracing the exterior surface of the sleeve 20. A unit is also usefully assembled, as shown most clearly in Fig. 5, wherein an additional metallic plate 26 is made, by the spun edge 27 of the outer cup 17, to press against the out-turned flange 28 of the thimble 19, the rubber ring in this case being compressed axially to provide spring pressure between the flange and the opposed plate 26. The addition of this plate provides a damping action useful in the better development of the vibration quenching function. It will be evident that, under certain conditions, however, this damping plate may be omitted.

In the modified form of construction shown in Figs. 6 and 7, there is shown a vibration reducing unit generally designated 30 in which the shaft and barrel portions of the flanged ferrule and cup, respectively, are serrated at 31 and 32, respectively, to interengage with other parts capable of imparting torsion, in which case the unit may be utilized to provide spring action through small angularity. By mounting such units in multiple any desired range of angular displacement may be achieved. This form of the unit may be utilized with or without the damping plate, and when a damping plate is provided it may be inserted between the inner and outer annuli in the manner shown in Fig. 5.

Both forms of the improved vibration quenching units may be mounted as bearings for shafts, or support bearings in which shafts may turn, in which case they furnish a self-alining and vibration reducing capability of service in high speed machinery, especially in machinery having some unbalanced components. Since such units may be clamped between shoulders they give angular motion possibilities with absolute sealing of the enclosure. This is valuable for shaft closure in oscillating mechanism. The form including the damping plate is particularly useful in such a case. The units may be used to provide drive for light shafts requiring universal action, and it is a prime aim of the invention to provide a standardized element which may be selected, with known characteristics, for a multiplicity of such purposes.

In the use of the improved vibration quenching means with the rock drill disclosed herein, it will be seen that when the operator grasps the handle grips and supports the rock drill in drilling position with respect to the work and the hammer piston of the hammer motor is operated to actuate percussively the drill steel, the vibratory action set up within the hammer motor by the hammer piston is substantially quenched by the vibration reducing units arranged between the handle bolt and the handle grips. These and other uses and advantages of the improved vibration reducing and damping means will be clearly apparent to those skilled in the art.

While there are in this application specifically described two forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a vibration reducing unit, coaxial annuli relatively movable into positions of non-coaxial relation and having inner and outer annular peripheral surfaces respectively engageable with a part to be vibrated and a part to be protected from shock, and a rubber annulus having its opposite faces bonded in shear to said annuli for yieldingly opposing relative movement of said annuli into said positions of non-coaxial relation.

2. In a vibration reducing unit, a cup-shaped outer annulus, a coaxial inner thimble, said annulus and thimble relatively movable into positions of non-coaxial relation and having annular bearing surfaces respectively on their outer and inner peripheries, one engageable with a part to be vibrated and the other with a part to be protected from shock, and a rubber annulus having its opposite faces bonded in shear and arranged between adjacent faces of said annulus and thimble for yieldingly opposing relative movement of said annulus and thimble into said positions of non-coaxial relation.

3. In a vibration reducing and damping unit, a pair of coaxial elements relatively movable into positions of non-coaxial relation and respectively engageable with a part to be vibrated and a part to be protected from shock, a rubber mass having its opposite faces bonded in shear to and arranged between adjacent faces of said elements for yieldingly opposing relative movement of said elements into said positions of non-coaxial relation, and a damping element cooperating with said elements for resisting relative movements of said elements into said positions of non-coaxial relation.

4. In a vibration reducing and damping unit, coaxial annuli relatively movable into positions of non-coaxial relation and respectively engageable with a part to be vibrated and a part to be protected from shock, a rubber annulus having its opposite faces bonded in shear to and arranged between adjacent faces of said annuli, and damping means cooperating with said annuli for resisting relative movement of said annuli into said positions of non-coaxial relation.

5. In a vibration reducing unit, inner and outer coaxial annuli relatively movable into positions of non-coaxial relation and having respectively inner and outer annular peripheral bearing surfaces, one engageable with an inner part to be vibrated and the other with an outer part to be protected from shock, and a rubber annulus having its opposite faces bonded in shear to and arranged between adjacent faces of said annuli for yieldingly opposing relative movement of said annuli into said positions of non-coaxial relation.

6. In a vibration reducing and damping unit, coaxial inner and outer sleeves relatively movable into positions of non-coaxial relation and respectively engageable with a part to be vibrated and a part to be protected from shock, said sleeves having flanges arranged in parallel relation, a rubber annulus having its opposite faces bonded in shear to and arranged between the adjacent faces of said parallel flanges for yieldingly opposing relative movement of said sleeves into said positions of non-coaxial relation, and a damping plate secured to the outer sleeve and frictionally engaging the inner sleeve for resisting relative movement of said sleeves into said positions of non-coaxial relation.

7. In a vibration reducing unit, coaxial inner and outer sleeves relatively movable into positions of non-coaxial relation and respectively engageable with a part to be vibrated and a part to be protected from shock, said sleeves providing cylindrical bearing surfaces and having flanges respectively on their outer and inner peripheries, said flanges arranged in parallel relation, and a rubber annulus having its opposite faces bonded in shear to and arranged between adjacent faces of said flanges for yieldingly opposing relative movement of said sleeves into said positions of non-coaxial relation, the body portions of said sleeves lying in over-lapping relation to form a housing for said rubber annulus.

8. In a vibration reducing means, a series of cooperating vibration reducing units each comprising coaxial elements relatively movable into positions of non-coaxial relation and respectively engageable with a central inner part to be vibrated and an outer part to be protected from shock, and a rubber annulus having its opposite faces bonded in shear between said coaxial elements for yieldingly opposing relative movement of said elements into said positions of non-coaxial relation.

9. In a vibration reducing means, the combination with a part to be vibrated and a part to be protected from shock and a bolt mounted on said first part, of vibration reducing means between said parts comprising a series of vibration reducing units mounted on said bolt and each including coaxial elements relatively movable into positions of non-coaxial relation, and a rubber annulus having its opposite faces bonded in shear between said coaxial elements for yieldingly opposing relative movement of said elements into said positions of non-coaxial relation.

10. In a vibration reducing means, a plurality of vibration reducing units each comprising coaxial annuli relatively movable into positions of non-coaxial relation and respectively engageable with a part to be vibrated and a part to be protected from shock and a rubber annulus having its opposite faces bonded in shear to and arranged between adjacent faces of said annuli, and means for interlocking said units together in series.

11. In a vibration reducing means, coaxial relatively rotatable annuli relatively movable into positions of non-coaxial relation and having inner and outer annular peripheral surfaces respectively engageable with a part to be vibrated and a part to be protected from shock, and a rubber torsion spring having its opposite faces bonded in shear between adjacent faces of said annuli for yieldingly opposing relative movement of said annuli into said position of non-coaxial relation, said torsion spring yieldingly resisting relative rotative movement of said annuli.

12. In a vibration reducing means, a plurality of vibration reducing units each comprising coaxial relatively rotatable annuli relatively movable into positions of non-coaxial relation and respectively engageable with a part to be vibrated and a part to be protected from shock and a rubber torsion spring having its opposite faces bonded in shear between adjacent faces of said annuli for yieldingly opposing relative movement of said annuli into said positions of non-coaxial relation, said torsion spring yieldingly resisting relative rotative movement of said annuli, and interlocking means on said annuli for interlocking the units together in series.

13. In a vibration reducing unit, a pair of members each presenting a plane surface, said members arranged with said surfaces in parallel relation and said members relatively movable in planes parallel to said plane surfaces, one member having an inner annular peripheral surface engageable with a part to be vibrated and the other member having an outer annular peripheral surface engageable with a part to be protected from shock, and a rubber annulus having its opposite faces bonded in shear to said parallel surfaces for yieldingly opposing said relative movement of said members.

14. In a vibration reducing unit, a pair of members having alined openings and having inner and outer annular peripheral supporting surfaces respectively engageable with a part to be vibrated and a part to be protected from shock, said members relatively movable into positions wherein said openings are out of alinement, and a rubber annulus having its opposite faces bonded in shear to said members for yieldingly opposing said relative movement of said members, said rubber annulus having its central opening alined with said openings in said members.

WARREN NOBLE.